United States Patent

Borello

[11] 4,229,985
[45] Oct. 28, 1980

[54] CONTINUOUS VARIABLE SPEED TRANSMISSION

[76] Inventor: Domenic Borello, 142 Nyac Ave., Pelham, N.Y. 10803

[21] Appl. No.: 863,393

[22] Filed: Dec. 22, 1977

[51] Int. Cl.³ .................... F16H 15/16; F16H 15/42
[52] U.S. Cl. .................................. 74/192; 74/193
[58] Field of Search .............. 74/192, 193, 191, 190, 74/217 CE, 230.17 A, 325, 388 R

[56] References Cited

U.S. PATENT DOCUMENTS

| | | | |
|---|---|---|---|
| 655,749 | 8/1900 | Allyne et al. | 74/192 |
| 2,432,442 | 12/1947 | Pourtier | 74/192 |
| 3,043,149 | 7/1962 | Davin et al. | 74/192 |
| 3,195,365 | 7/1965 | Coakley et al. | 74/193 |
| 3,257,857 | 6/1966 | Davin et al. | 74/192 |
| 3,349,642 | 10/1967 | Alsch | 74/192 |
| 3,572,145 | 3/1971 | Sporck | 74/192 |
| 3,736,803 | 6/1973 | Horowitz et al. | 74/192 |

FOREIGN PATENT DOCUMENTS

| | | | |
|---|---|---|---|
| 652279 | 5/1933 | Fed. Rep. of Germany | 74/192 |
| 2354409 | 9/1974 | Fed. Rep. of Germany | 74/192 |
| 579345 | 10/1924 | France | 74/192 |
| 812631 | 5/1937 | France | 71/193 |
| 859023 | 12/1940 | France | 74/192 |
| 362639 | 8/1938 | Italy | 74/192 |

*Primary Examiner*—Samuel Scott
*Assistant Examiner*—Daniel O'Connor

[57] ABSTRACT

The present invention relates to a variable speed traction drive employing combinations of the following shapes; cones, internally tapered sleeves, dual faced internally tapered sleeves, and a combination of a dual faced internal wheel with a dual faced external shape.

The primary purpose of the shapes and the manner in which they engage in traction is to achieve a matched geometry between the contacted rolling components, to increase the contacting surface areas, to engage each other in a point to point relationship, and to maintain a narrow or small difference between the largest diameter of any of the rolling components of the drive and the smallest diameter of any of the rolling components of the drive. For example, a velocity difference occurs when a cylinder is driven by traction by a cone roller, or when two cones whose angles are not alike are driven one to the other by traction. Further, when two cones are configured with like angles and they are geometrically arranged to drive one to the other, but have extreme differences of diameters, a difference of velocity also occurs between the two cones to a much lesser degree.

In some of the illustrated species cone angles vary acutely or additional cones are used to produce more desirable effects. However, all additions or cone angle variations remain true to the generic element of the invention which is the matched geometry and the maintaining of narrow differences of diameter between the rolling components.

The aforementioned features of this drive and other features of this invention are all directed toward reducing the scrubbing and slippage losses that are caused by differences of velocity that are always present in an infinite variable speed drive. All of the variations illustrated in FIGS. 1,2,3,4,7,8,9,10 and 11 are basically the same and follow a generic progression of geometry that for the purpose of simplicity will herein after be referred to as cones, sleeves and matching geometry.

2 Claims, 11 Drawing Figures

CONTINUOUS VARIABLE SPEED TRANSMISSION

DISCUSSION OF THE PRIOR ART

In the prior art the shapes of the rolling traction components are not configured to match each other geometrically, resulting in a velocity difference of one rolling component to the other that causes locking of the drive. For example, in the prior art when four cones and one sleeve are employed the following problems result; there are large differences of diameter between the cones and the sleeves resulting in slippage loss, misalignment results in greatly diminished rolling contact surface, (alignment is critical to the successful use of the machine), the load on the sleeves and cones occurs similar to a variable speed belt drive and is predominantly on one side, there can never be a 100% traction position and traction or contact surface is always decreased to achieve effeciency.

Additionally, in the prior art attempts to drive a sleeve surrounding two cones which have their apexes facing each other to form a variable speed drive, lack a means to maintain stability, matching geometry at all pressure points and a sufficient traction to result in a viable drive.

SUMMARY OF THE INVENTION

This invention successfully achieves the correct geometry that produces the following results while remaining within the generic theme of all the species; all rollers used to increase traction by supporting the driver and driven components of the drive are geometrically matched to the roller they support. The drive allows a constant pressure employed in such a way that all driver power transfer sleeves and all driven components are in a traction wedged nipped condition and are kept in that condition by the use of springs and/or hydraulic pressure. The pressure is maintained by the driver component in combination with the power transfer sleeve which floats or the driven component in combination with the power transfer sleeve which also floats, thus maintaining a constant and continuous pressure without any need for adjustment.

The drive can be driven at speeds comparable to the rated speed of the shaft bearings without the usual heat buildup.

Additional components can be added, thus increasing the horsepower handling capacity.

The range of input speed to output speed is suitable for most applications. For example, by adding another unit in series the ratio of input to output speed can be further increased.

It is the object of this invention to minimize all scrubbing, slipping and differences of velocity between contact rolling components, and to greatly increase the traction surfaces, and to also reduce the number of working parts that transfer the input horsepower and speed to the output horsepower and speed. Thereby, resulting in a highly effecient variable speed traction drive that is less expensive to manufacture and maintain because it does not require highly skilled labor to manufacture or repair.

According to this invention the scrubbing, slipping and differences of velocity encountered in the prior art have been minimized by the use of the two tapered sleeves that are geometrically configured to allow the transfer or rotational movement from a driver cone or sleeve to a driven cone or sleeve while maintaining point to point contact along a line of contact. It also permits combinations of cones and sleeves to be placed parallel and to remain parallel while simultaneously maintaining parallel shaft connections and rotating shaft center lines. Further, it corrects the geometric mismatch between the following shapes and combinations of shapes; cones, sleeves, single internally tapered sleeves, dual faced internally tapered sleeves, and a combination of a dual faced internal sleeve with a dual faced external shape.

The primary design feature of the power transfer sleeves is that they correct the geometry of the sleeve that they drive, so that the geometry of the drive remains correct through the range of the speed.

For the purpose of better understanding the manner in which this uniquely shaped sleeve corrects the geometric mismatch between conical parallel surfaces and increases the traction surface the illustrations set forth in this invention will place the sleeve so that the action is visible. It is also the intention that the other illustrated embodiments be considered as part of the invention, and although it is the two sleeves that allow this drive to be completely successful, the other configurations illustrated, because they result in a viable variable speed drive and are generically true to this invention, be also considered as part of the claims.

The illustrations will show various methods using the traction action through the sleeves that are geometrically configured so that all rolling surfaces can be held in traction and will follow each other point to point without the problems encountered in the prior art, such as the necessity of constant pressure through an auxiliary external force, relocation of rotating axis of their sleeves and cones, backsliding, slipping and scrubbing. The illustrations will also show the increased traction surface.

BRIEF DESCRIPTION OF THE DRAWINGS

FIG. 7 is a side view of the drive and will be used to describe the manner in which it operates. FIG. 8 is an end view of FIG. 7 and FIG. 9 is a top view of FIG. 7.

PREFERRED EMBODIMENT

Figure 3:
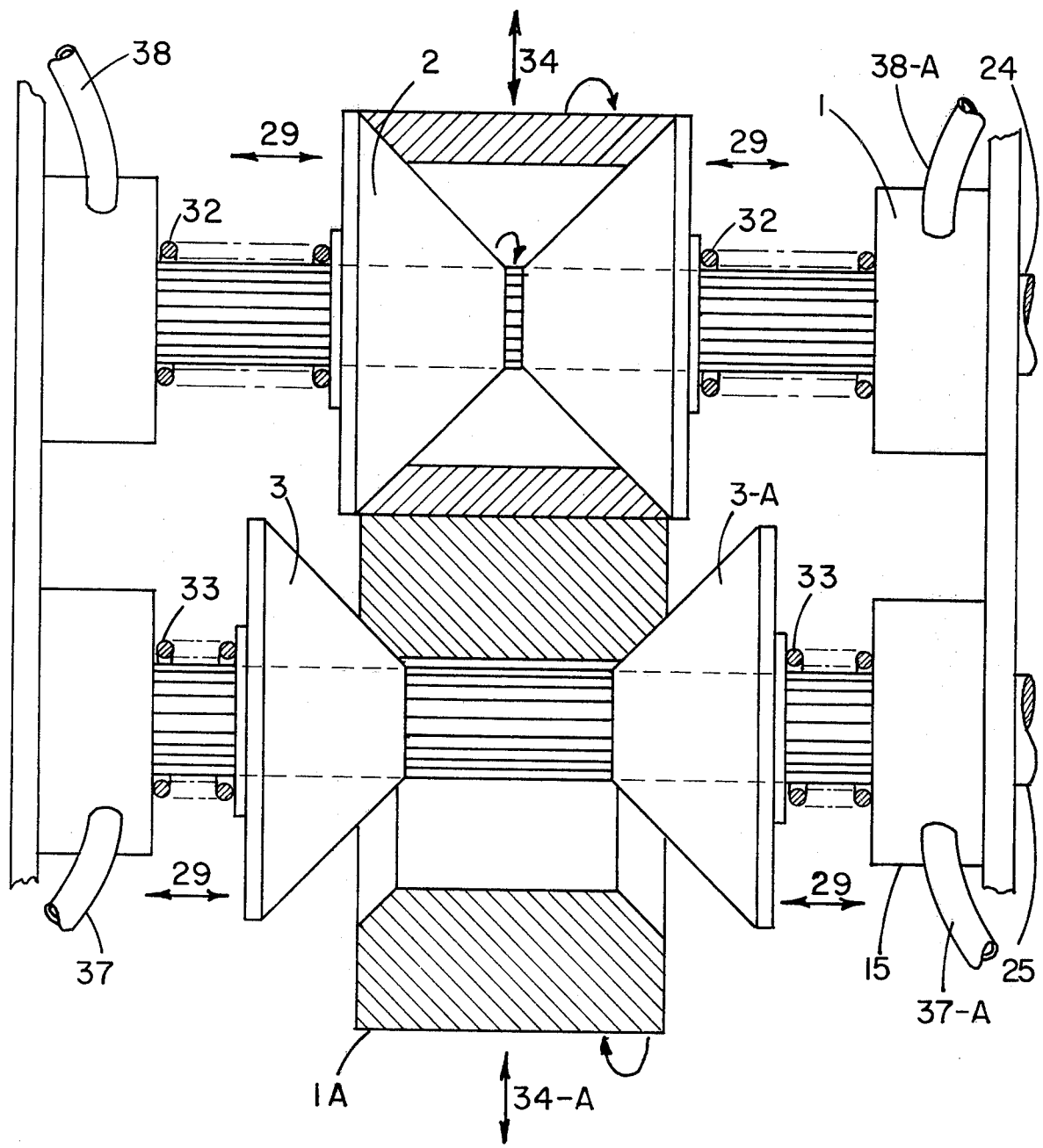
FIG. 3 is basically the same in its generic geometry as FIG. 1, except that four cones; 2 and 2A, and 1 and 1A, are combined to increase the traction force and assist in stabilizing sleeves 1 and 1A. Both FIGS., 1 and 3 maintain a maximum efficiency geometrically, and maximum traction contact as compared to the prior art.
Figure 5:
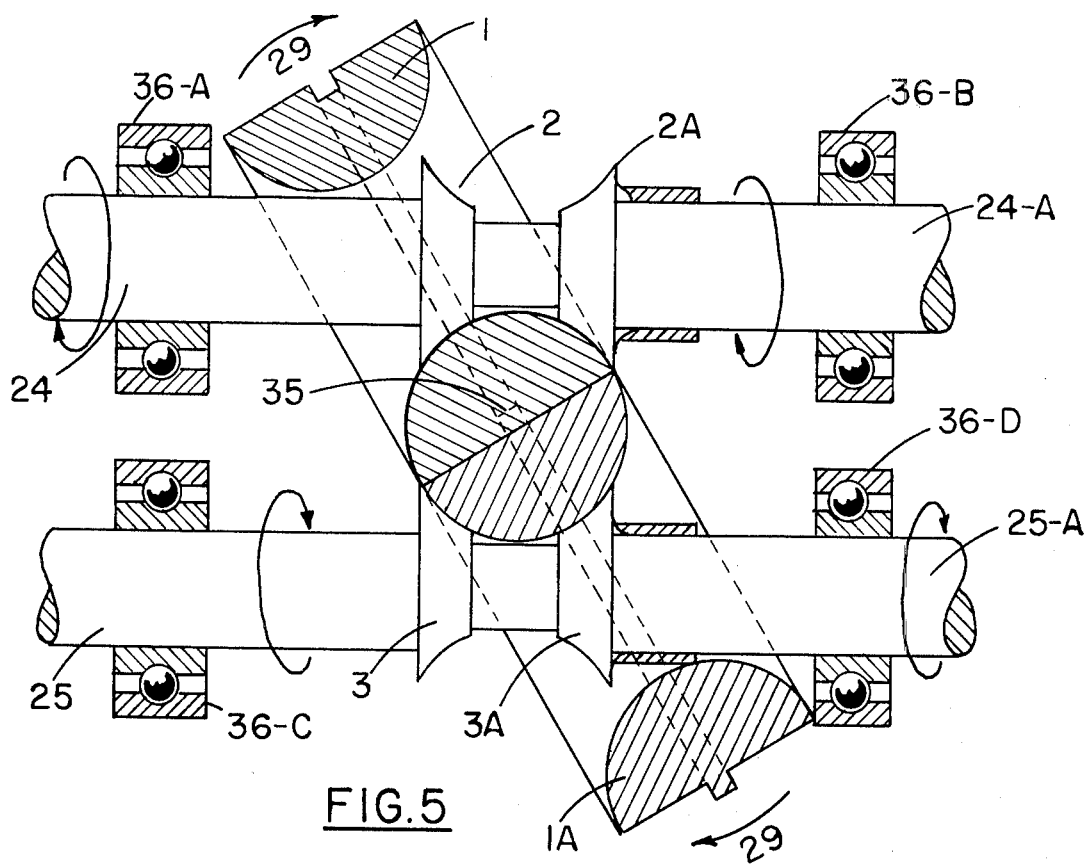
FIGS. 5 and 6 illustrate alternate embodiments of the invention.
Figure 4:
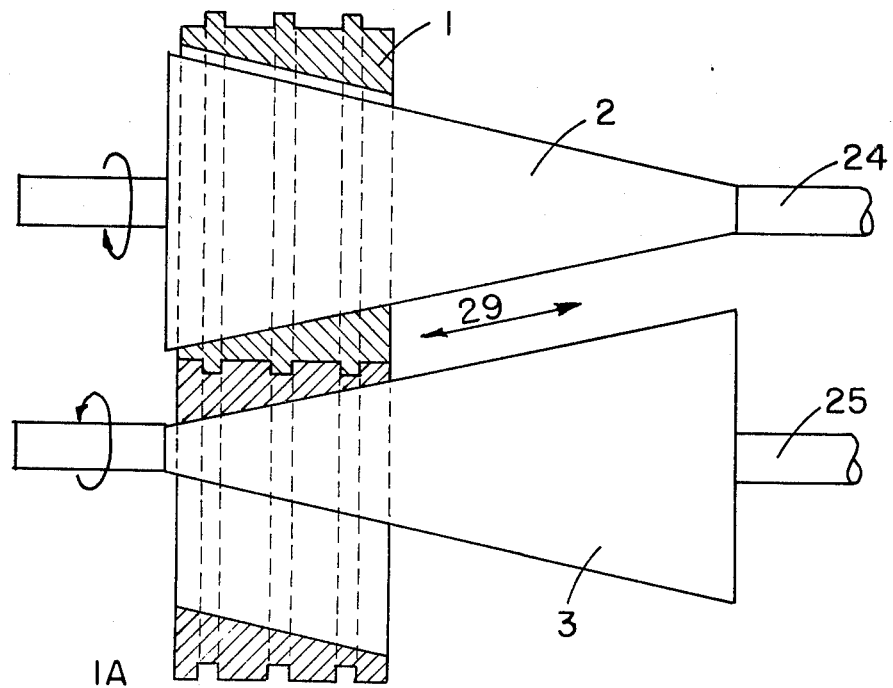
FIG. 4 is a simplified version of FIG. 1.

FIG. 3 of the drawings represents the preffered embodiment.

Figure 1:
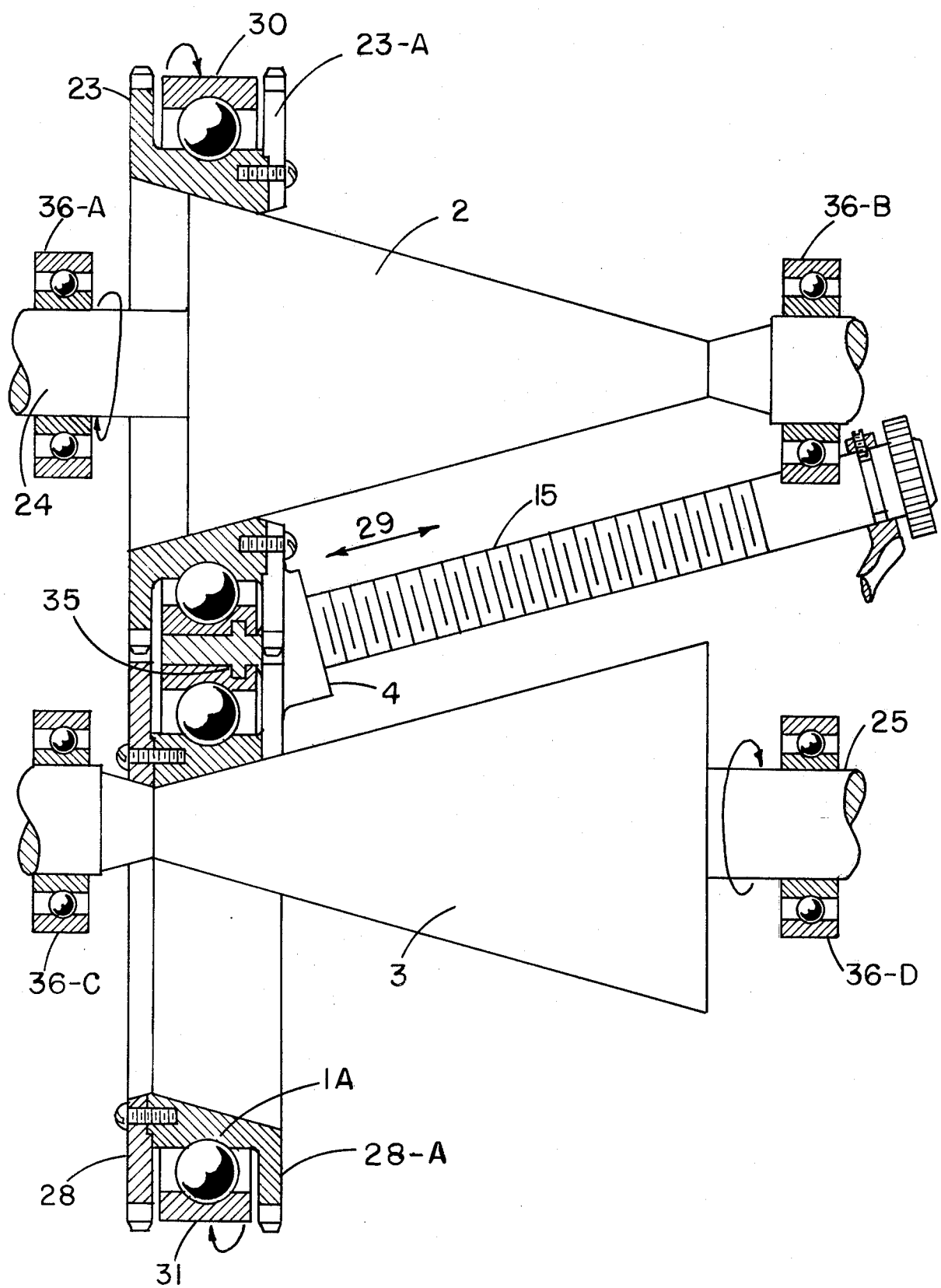
FIG. 1 is a cutaway of a side view of the second preferred embodiment showing two cones, 2 and 3, that are facing in opposite directions; two internally tapered sleeves 1 and 1A; bearings 30 and 31; and carrier 4.

The following will describe the rolling and speed positions of the two cones, cones 2 and 3, that are facing in opposite directions; the two internally tapered sleeves, 1 and 1A; bearings 30 and 31; and carrier 4 as they are shown in FIG. 1: input shaft 24 is directly connected to cone 2; when shaft 24 starts to revolve cone 2 also revolves causing sleeve 1, that is in full engagement with cone 2, to be driven by full traction. Attached to both sides of sleeve 1 are two gears, 23A and 28B, that drive sleeve 1A which in turn drives shaft 25 through cone 3; outer races 30 and 31 in combination with sleeves 1 and 1A form bearings that are compressed against one to the other, so that traction can be maintained against the cones. Outer races 30 and 31 are also an integral part of carrier housing 4. The drive in FIG. 1 is in high speed with the input cone 2 fully engaged with sleeve 1 at its largest diameter and driving output cone 3 at its smallest diameter and its lowest efficiency position. To increase the speed of the drive carrier 4 is moved by speed adjustment screw 15 in the direction of the small diameter of cone 2.

Figure 2:
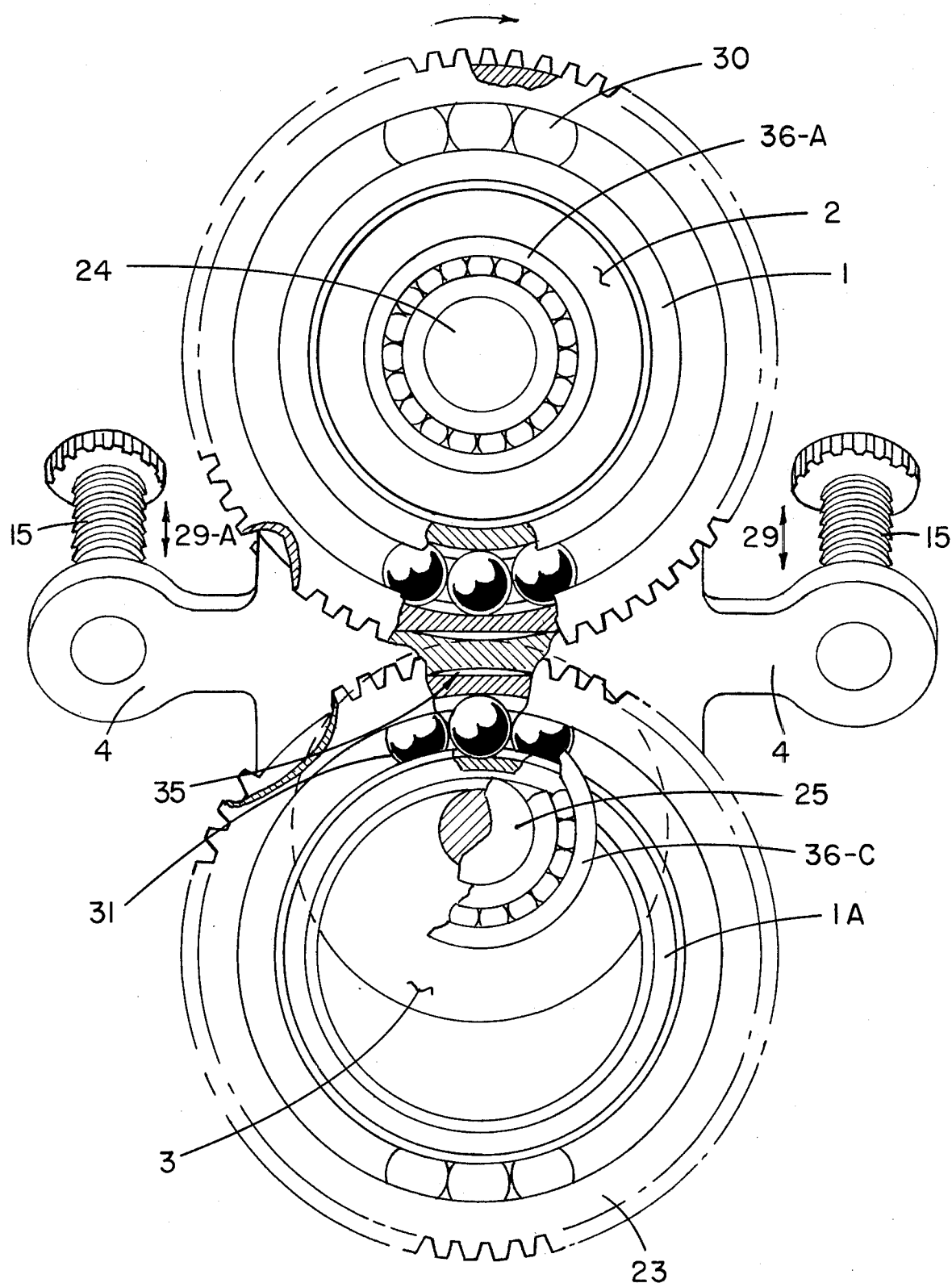
FIG. 2 is a partially cutaway end view of FIG. 1 and is in the same speed position as FIG. 1.

FIG. 2, which is in the same speed position as FIG. 1, depicts the sleeves, cones, bearings, housing, and speed change screw. The cycle as described in FIG. 1 would be as follows: input shaft 24 is directly connected to cone 2 which is in full engagement by traction to sleeve 1; sleeve 1 is maintained by a pre set pressure through shaft bearings 36A, B, C, and D, so that cone 2 bears against the internal conforming diameter of sleeve 1; sleeve 1 transfers its pressure through bearing 30; bearing 30 transfers its pressure at point 35 to bearing 31 which in turn transfers the pressure to cone 3. Point 35 is also used to maintain the proper clearance between gears 23A and 28B. Rotational motion is transferred through gears 23A and 23B, and through gears 28A and 28B. The outer races of bearings 30 and 31 do not revolve, they are set in a fixed position in carrier 4 and act as a means to manage the speed change and to stabilize the sleeves 1 and 1A.

FIG. 3 operates in the following manner: starting with splined input shaft 24 which is connected to two internally splined cones, cones 2 and 2A, shaft 24 is made to revolve and causes by full traction sleeve 1 to revolve; sleeve 1 is held in full traction by cones 2 and 2A; in turn cones 2 and 2A are held in tension against sleeve 1 by springs 32 and hydraulic pistons 38 and 38A. Sleeve 1 transfers its rotation to sleeve 1A and provides a neutral position in the drive, so that the geometry required to produce a nearly perfect drive can be maintained. The rolling point 35 retains its geometry with no difference of velocity at any time during the range of the drive. Additionally, the length of the surface contact can be increased to any degree without any adverse effect. A gear can be used, as shown in FIG. 1, to guarantee no slip at point 35. Sleeve 1A, by internal traction, drives splined output shaft 25; output cones 3 and 3A are held in compression by springs 33 and hydraulic pistons 37 and 37A. When a speed change is required pressure is released from hydraulic pistons 38 and 38A and pressure is increased at hydraulic pistons 37 and 37A. At point 35 there is no physical connection between sleeves 1 and 1A, other than rolling contact, thus the usual problems encountered in the prior art are eliminated and the machine remains simple to manufacture and operate.

Figure 7:
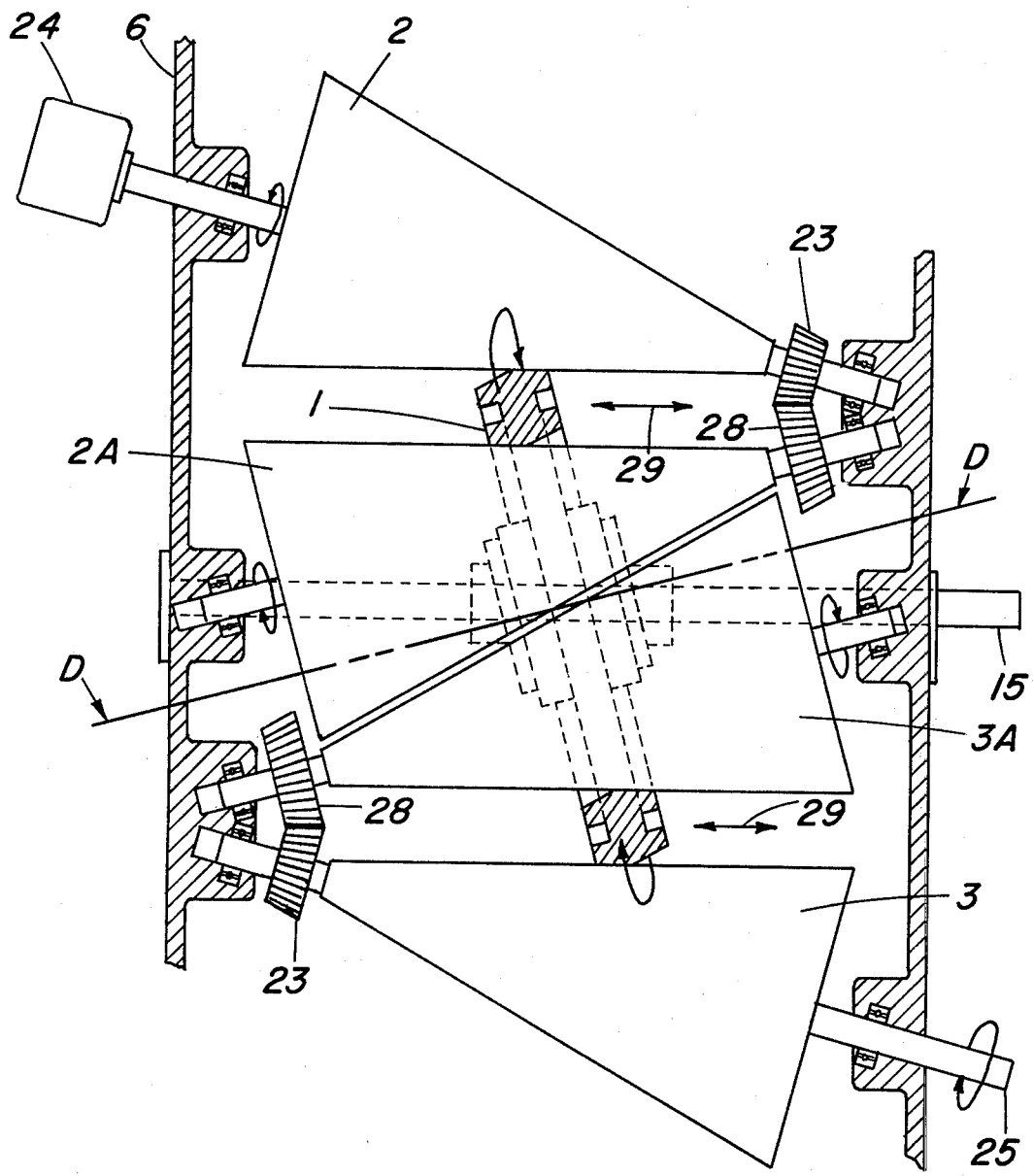
FIGS. 7, 8, and 9 depict four cones 2, 2A, 3, 3A, and one sleeve 1.
Figure 8:
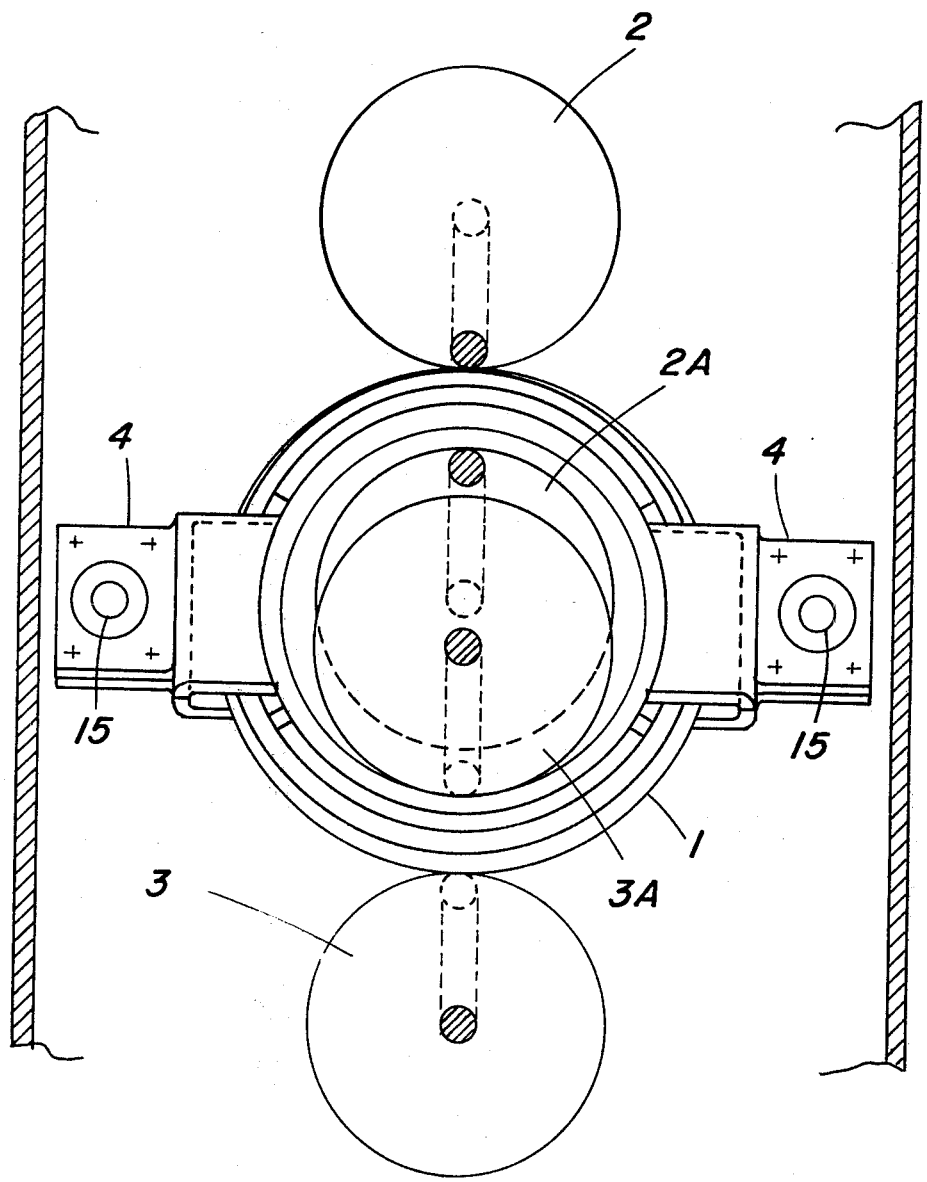
Figure 9:
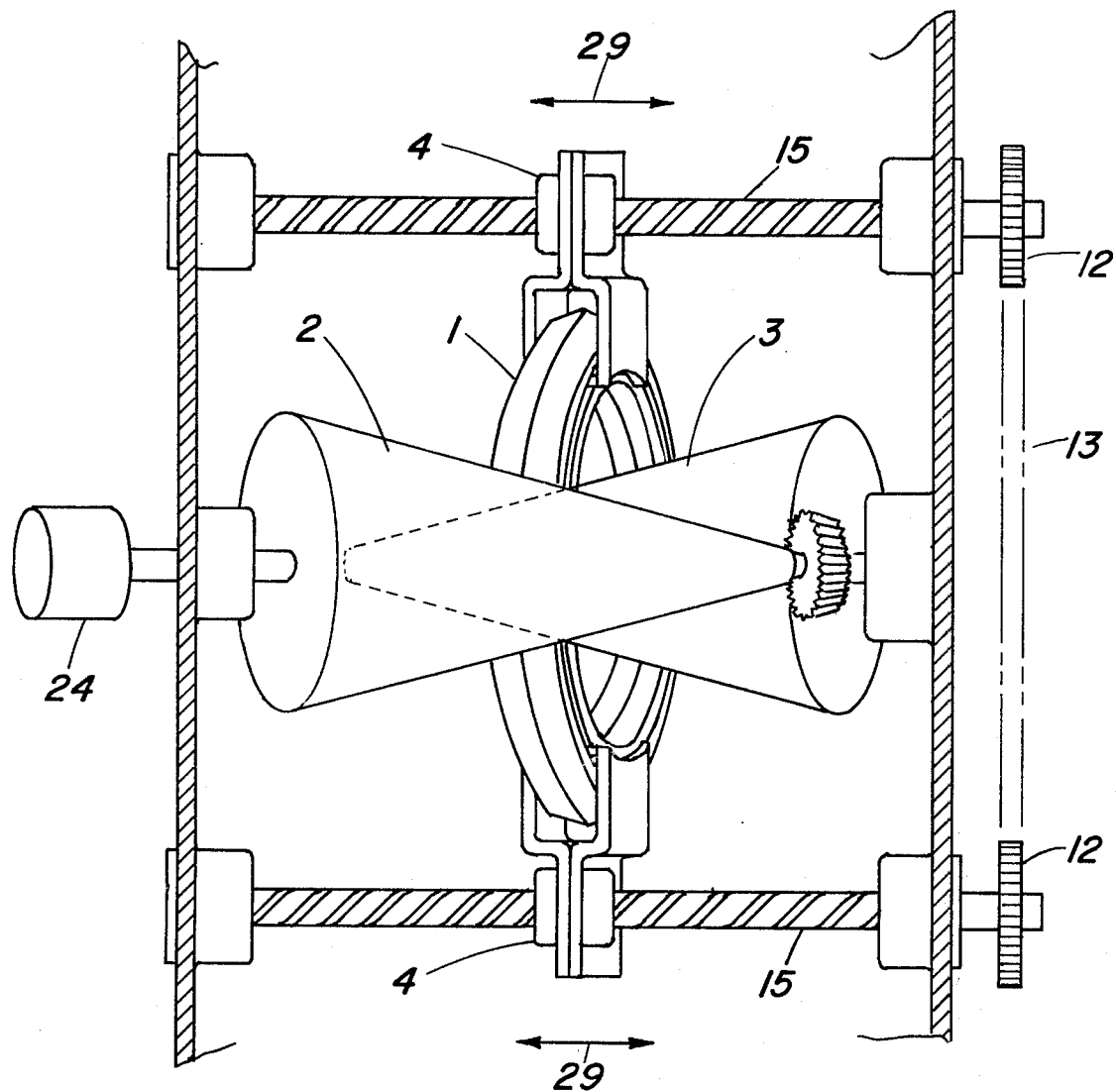

The cycle for FIG. 7 is as follows: shaft 24 which is part of cone 2 has an angled gear 23 at one end is made to rotate; simultaneously with the start of rotation cone 2 drives, by traction, one of the surfaces of externally dual tapered sleeve 1; cone 2 also drives gear 23 which is journalled for rotation to cone 2; gear 23 in turn, drives a second gear, which is journalled for rotation to cone 2A, this second gear is larger than gear 23 in order to compensate for the peripheral velocity differences between the inside diameter of the sleeve and the outside diameter of the sleeve, so that cone 2A drives, by traction, one of the internal surfaces of sleeve 1 resulting in a rolling and nipping action similar to the method used in Patent No. 3,894,439. Sleeve 1 thereafter uses the remaining internal and external surfaces to drive, by traction, cones 3 and 3A. Cones 3 and 3A are linked together by gears 28 and 23, so that they operate the same as the drive cones 2 and 2A. The speed change is made by moving carrier 4 in the direction of arrow 29.

Figure 11:
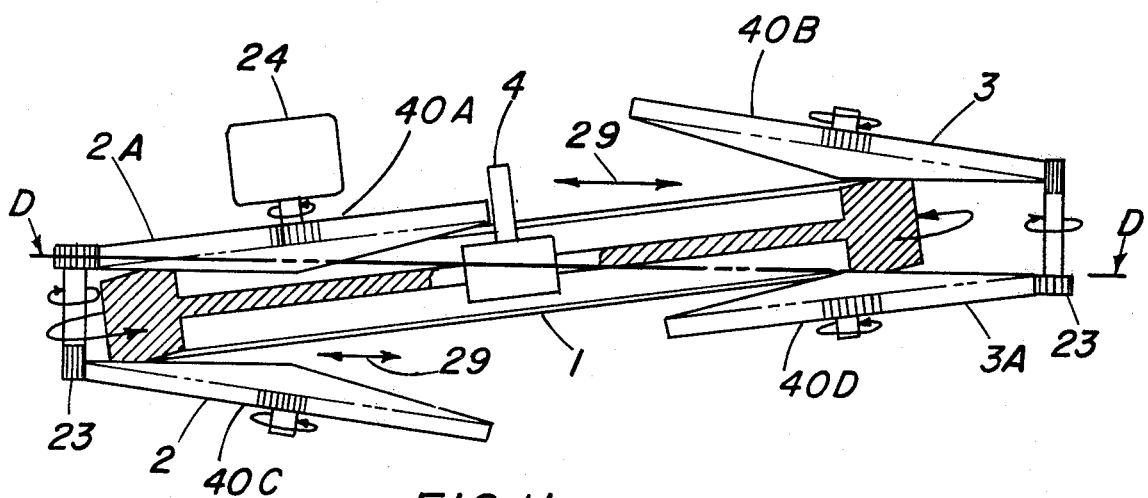
FIG. 11 depicts the same design as FIG. 7 using a very shallow angle causing the sleeve to closely resemble a wheel. However, it still retains the basic generic theme of matching geometry.
Figure 10:
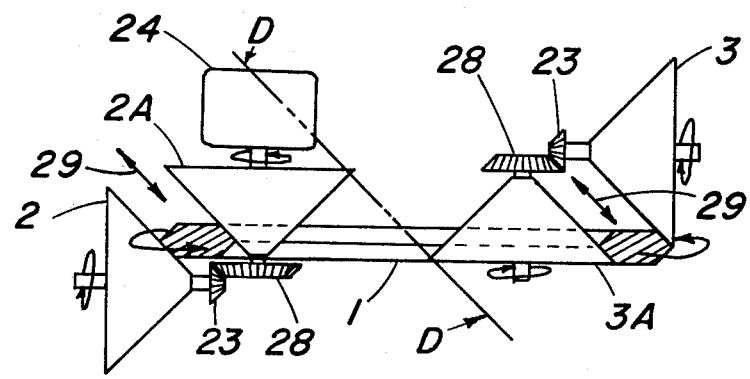
FIG. 10 depicts the same design as FIG. 7 using 90 degree cones.
Figure 6:
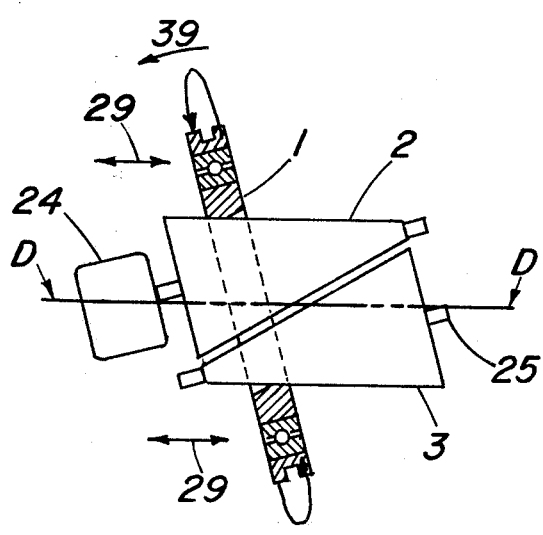

FIG. 11 operates in the following manner: shaft 24 rotates cone 2A which in turn drives, by traction, sleeve 1; gear 40A, which is an integral part of cone 2A, drives gear 23; gear 23, which is journalled for rotation, drives gear 40C which is an integral part of cone 2, so that cones 2 and 2A drive, by traction, sleeve 1 in a nipped rolling action; sleeve 1 transfers its rolling action to output cones 3 and 3A, whose design is the same as input cones 2 and 2A. The speed change is accomplished by moving the sleeve in the direction of arrow 29. Because it is possible to place the sleeve on a hub, the center of the sleeve or sleeve carrier 4 is used as a carrier stabilizer and as a means for speed change.

What is claimed is:

1. A variable speed transmission comprising a driving shaft and a driven shaft journalled for rotation in spaced apart parallel relation and disposed in a common plane, a first pair of driving cones operatively arranged with the apexes thereof in facing relation to each other disposed for sliding movement in opposite directions along said driving shaft, each said cone of said first pair having sides oriented at a select acute angle to the rotational axis of said driving shaft, a second pair of driven cones operatively arranged with the apexes in facing relation to each other disposed for sliding movement in opposite directions along said driven shaft, each said cone of said second pair having sides oriented at a select acute angle to the rotational axis of said driven shaft, a first hollow cylindrical sleeve member having edges bounding opposite end openings into the hollow interior of the said sleeve, thereof oriented at the same angle as said sides of said cones of said first pair having an operative position in supported relation suspended between said first pair of cones, a second hollow cylindrical sleeve member having edges bounding opposite end openings into the hollow interior of the said sleeve, thereof oriented at the same angle as said sides of said cones of said second pair having an operative position in supported relation suspended between said second pair of cones, and means for varying the speed ratio between said driving shaft and said driven shaft by the sliding movement of said first and second pairs of cones into operative positions on said driving and driven shafts to produce frictional driving contact at the interface of the external surfaces of said first and second cylindrical sleeve members and frictional driving contact at the end opening edges thereof respectively with said first and second pairs of cones, whereby rotation of said driving shaft is transmitted with no slippage at the driven shaft when said pair of cones are brought together at their apexes thereby completely locking said first cylindrical sleeve member reducing said first pair of cones and said first cylindrical sleeve member to essentially a single rotating unit.

2. A variable speed transmission comprising a driving shaft and a driven shaft journalled for rotation in spaces apart parallel relation and disposed in a common plane, a first pair of driving cones operatively arranged with the apexes thereof in facing relation to each other disposed for sliding movement in opposite directions along said driving shaft, each said cone of said first pair having sides oriented at a select acute angle to the rotational axis of said driving shaft, a second pair of driven cones operatively arranged with the apexes in facing relation to each other disposed for sliding movement in opposite directions along said driven shaft, each said cone of said second pair having sides oriented at a select acute angle to the rotational axis of said driven shaft, a first hollow cylindrical sleeve member having edges bounding opposite end openings into the hollow interior of the said sleeve, thereof oriented at the same angle as said sides of said cones of said first pair having an operative position in supported relation suspended between said first pair of cones, a second hollow cylindrical sleeve member having edges bounding opposite end openings into the hollow interior of the said sleeve, thereof oriented at the same angle as said sides of said cones of said second pair having an operative position in supported relation suspended between said second pair of cones, and means for varying the speed ratio between said driving shaft and said driven shaft by the sliding movement of said first and second pairs of cones into operative positions on said driving and driven shafts to produce frictional driving contact at the interface of the external surfaces of said first and second cylindrical sleeve members and frictional driving contact whereby said first pair of cones are not required to be in alignment or to remain in alignment with said second pair of cones in order for the apparatus to be in frictional engagement.

* * * * *